(12) United States Patent
Hartikainen et al.

(10) Patent No.: US 6,483,830 B1
(45) Date of Patent: Nov. 19, 2002

(54) DATA TRANSMISSION METHOD AND BASE STATION SYSTEM

(75) Inventors: Jari Hartikainen, Kerava (FI); Hannu Vaitovirta, Espoo (FI)

(73) Assignee: Nokia Telecommunications Oy, Espoo (FI)

(*) Notice: Subject to any disclaimer, the term of this patent is extended or adjusted under 35 U.S.C. 154(b) by 0 days.

(21) Appl. No.: 09/254,512

(22) PCT Filed: Oct. 8, 1997

(86) PCT No.: PCT/FI97/00611

§ 371 (c)(1),
(2), (4) Date: Mar. 9, 1999

(87) PCT Pub. No.: WO98/16037

PCT Pub. Date: Apr. 16, 1998

(30) Foreign Application Priority Data

Oct. 9, 1996 (FI) .................................................. 964047

(51) Int. Cl.⁷ ............................................... H04J 3/26
(52) U.S. Cl. ....................... 370/349; 370/463; 370/466; 370/469; 370/528; 370/395.1
(58) Field of Search ............................... 370/277, 278, 370/310.1, 337, 347, 349, 395.1, 395.5, 395.6, 395.65, 419, 466, 467, 469, 471, 473, 442, 463, 528, 529

(56) References Cited

U.S. PATENT DOCUMENTS

| | | | |
|---|---|---|---|
| 5,420,863 A | * 5/1995 | Taketsugu et al. | 370/337 |
| 5,434,854 A | * 7/1995 | Focarile et al. | 370/335 |
| 5,550,820 A | 8/1996 | Baran | |
| 5,566,173 A | * 10/1996 | Steinbrecher | 370/396 |
| 5,600,633 A | * 2/1997 | Jaisingh et al. | 370/338 |
| 5,684,791 A | * 11/1997 | Raychaudhuri et al. | 370/280 |
| 5,721,732 A | * 2/1998 | Emeott et al. | 370/437 |
| 5,878,045 A | * 3/1999 | Timbs | 370/328 |
| 5,889,770 A | * 3/1999 | Jokiaho et al. | 370/337 |
| 5,930,241 A | * 7/1999 | Fried | 370/328 |
| 6,034,950 A | * 7/2000 | Sauer et al. | 370/466 |
| 6,122,262 A | * 9/2000 | Desseignes et al. | 370/328 |
| 6,188,680 B1 | * 2/2001 | Ohki | 370/338 |
| 6,285,684 B1 | * 9/2001 | Suzuki | 370/471 |

FOREIGN PATENT DOCUMENTS

| | | |
|---|---|---|
| EP | 0 729 282 | 8/1996 |
| EP | 0 796 022 | 9/1997 |
| WO | WO 93/00778 | 1/1993 |
| WO | WO 93/19559 | 9/1993 |

OTHER PUBLICATIONS

Mascoli, et al, "Alternative Scenarios for Data Applications Via Internet—Mobile and DECT—ATM Interworking", *1995 Fourth IEEE International Conference on Universal Personal Communications Record*, pp. 788–792, Nov. 1995.

Mc Tiffin et al., "Mobile Access to an ATM Networking Using a CDMA Air Interface", *IEEE Journal on Selected Areas in Communications*, vol. 12, No. 5, pp. 900–907, Jun. 1994.

A copy of the International Search Report for PCT/FI97/00611.

* cited by examiner

Primary Examiner—Hassan Kizou
Assistant Examiner—David Odland
(74) Attorney, Agent, or Firm—Altera Law Group, LLC

(57) ABSTRACT

The invention relates to a data transmission method and a base station system. The method comprises transmitting radio interface information over a bidirectional data link between a base station and a base station controller. The radio interface information comprises signalling information, user information and error control information. The method is characterized in that the radio interface information is compressed to fit into at least one ATM cell by replacing the original error control information of the radio interface information with simple status information. Other information may also be compressed and inserted into the ATM cell. Realization of the method is exemplified in the DECT system. The invention also relates to the necessary means and their protocol stacks.

18 Claims, 5 Drawing Sheets

DATA TRANSMISSION METHOD AND BASE STATION SYSTEM

FIELD OF THE INVENTION

The invention relates to a method of transmitting radio interface information over a bidirectional data link between a base station and a base station controller, said radio interface information comprising signalling information, user information and error control information, and said method comprising inserting the signalling information and user information into ATM cells.

BACKGROUND OF THE INVENTION

FIG. 1 shows a radio system comprising a fixed part 100 and portable part 130. The fixed part comprises a base station 110 and base station controller 120. The fixed part 100 also comprises a network system and network management system, which are not shown since they are not relevant to the present problem. Between the base station 110 and the portable part 130 there is a bidirectional radio link 140, over which radio interface information is transmitted. The radio interface information comprises signalling information, user information and error control information. The devices of the system use the signalling information to signal with one another and with devices not shown (e.g. the mobile switching centre). The user information is proper payload, e.g. user's speech or data. The base station 110 preprocesses the information, after which it is transmitted to the base station controller 120.

In the systems of the prior art the signalling information and user information included in the radio interface information are separated from each other in means 116 in the base station 110, whereby the signalling information is transmitted to means 112 and the user information to means 114. Correspondingly, the base station controller 120 comprises means 122 for processing signalling information, means 124 for processing user information and means 126 for recombining the signalling information with the user information. There are separate data links in use between the base station 110 and the base station controller 120: a bidirectional data link 142 for transmitting signalling information and a bidirectional data link 144 for transmitting user information.

The prior art arrangement described above has several disadvantages. If the data links 142, 144 described are not only logically but also physically separate, extra costs will arise from this. It is necessary that both the base station 110 and base station controller 120 have two sets of means 112, 114, 122, 124 for processing separate pieces of information. This increases the production costs of the devices 110, 120 in question. Additional control information has to be transmitted over the data links 142, 144 in order to manage the separate pieces of information, which complicates the processing needed in the base station 110 and base station controller 120. In case the means 112 in the base station 110, which are used for processing the signalling information, have some information on the contents of the signalling information or user information (e.g. if the means 112 have functionality with respect to layer 2 of the OSI. (Open Systems Interconnection) model of the ISO, i.e. the data link layer), it is necessary to change all the base stations 110, if the signalling is altered. This causes considerable maintenance costs for the operator during the use of the system.

BRIEF DESCRIPTION OF THE INVENTION

The object of the invention is to provide a method of transmitting radio interface information over a bidirectional data link between a base station and a base station controller by means of which the disadvantages of the prior art solutions can be obviated.

This is achieved with the method set forth in the introduction. The method is characterized in that the radio interface information is compressed to fit into at least one ATM (Asynchronous Transfer Mode) cell by replacing the original error control information of the radio interface information with simple status information.

The invention also relates to a system for transmitting radio interface information over a bidirectional data link between a base station and a base station controller, said radio interface information comprising signalling information, user information and error control information, the signalling information and user information being inserted into ATM cells in said system.

The system is characterized in that the base station and base station controller comprise means for compressing the radio interface information to fit into at least one ATM cell by replacing the original error control information of the radio interface information with simple status information.

The method of the invention has several significant advantages. Only one set of means is needed in the base station and base station controller for transmitting the signalling information and user information. According to the invention, the radio interface information is compressed to fit into at least one ATM cell by replacing the original error control information of the radio interface information with simple status information. This is possible since the ATM data link is assumed to be so reliable that it is not necessary to transmit the original error control information of the radio interface information over the ATM data link. The error correction mechanisms of the ATM data link are sufficient. Hence, the structure of the base station and base station controller will be simpler and less expensive, and in addition both the devices will be smaller. The processing needed is much simpler in the base station and base station controller. The signalling information and user information are processed in the base station controller. It is no longer necessary to alter base stations when new signallings are introduced. This allows significant savings on costs for the operator. The invention allows the use of the transmission methods enabled by the ATM, e.g. statistical multiplexing by means of which it is possible to save on costs arising from the construction and/or use of transmission lines. One embodiment of the invention is the DECT-PABX (Digital European Cordless Telephone, Private Automatic Branch Exchange) system, which uses an ATM-based LAN (Local Area Network) as the transmission path.

The advantages of the system of the invention are the same as those described above in connection with the method. Preferred embodiments and other more detailed embodiments of the invention highlight its advantages. It is obvious that preferred embodiments may be combined with detailed embodiments in different ways so as to achieve the desired technical effect.

BRIEF DESCRIPTION OF THE DRAWINGS

In the following, the invention will be described in greater detail by means of examples with reference to the accompanying drawings, in which.

DETAILED DESCRIPTION OF THE INVENTION

Figure 1:
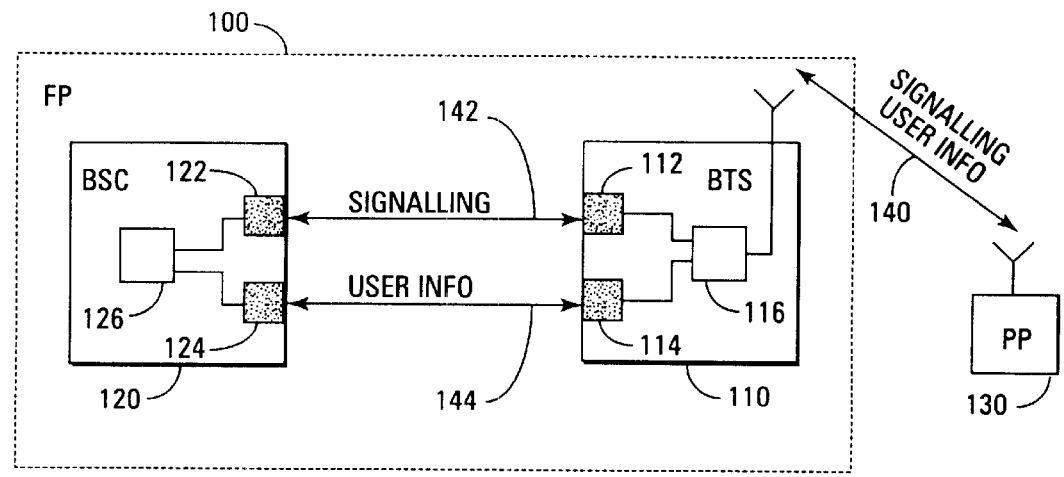
FIG. 1 shows a solution of the prior art described above.
Figure 2:
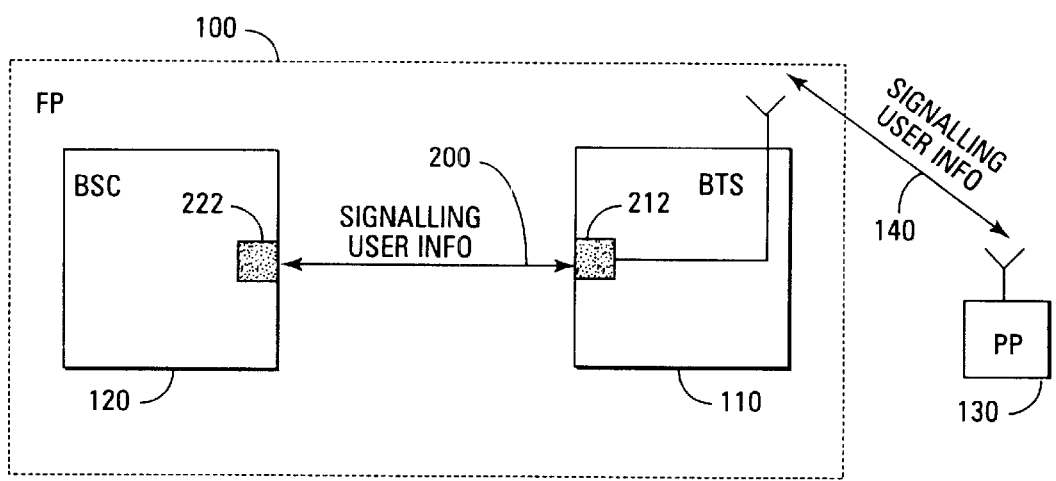
FIG. 2 shows a solution of the invention.

In FIG. 2 there is a bidirectional radio link 140 between the portable part 130 and the fixed part 100. The base station 110 and base station controller 120 comprise means 212, 222 for transmitting the signalling information and user information of the radio interface information 140.

Figure 3:
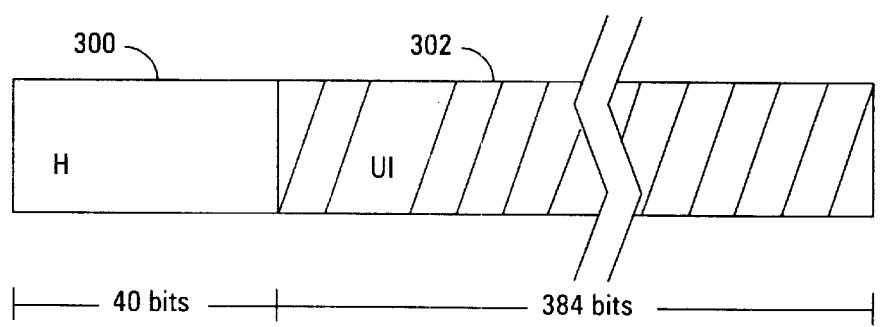
FIG. 3 shows the structure of an ATM cell.

FIG. 3 illustrates the structure of an ATM cell. The ATM cell comprises an identification data part 300 of 40 bits and a user information part 302 of 384 bits. According to the invention, the radio interface information is compressed to fit into at least one ATM cell by replacing the original error control information of the radio interface. information with simple status information. The radio interface information is grouped into some form, e.g. into frames or into time slots in the DECT system. The information to be transmitted is inserted into one or more ATM cells. The identification data 300 of the ATM cell includes identification data on the ATM cell, base station address and time slot.

The following example will describe realization of the invention in the DECT system. The DECT is a microcellular radio system which operates within the frequency range of 1880 to 1900 MHz. The number of carrier waves is 10. By employing the TDMA (Time Division Multiple Access) principle, 24 time slots are multiplexed per one frame of 10 ms on the carrier wave.

Figure 4:
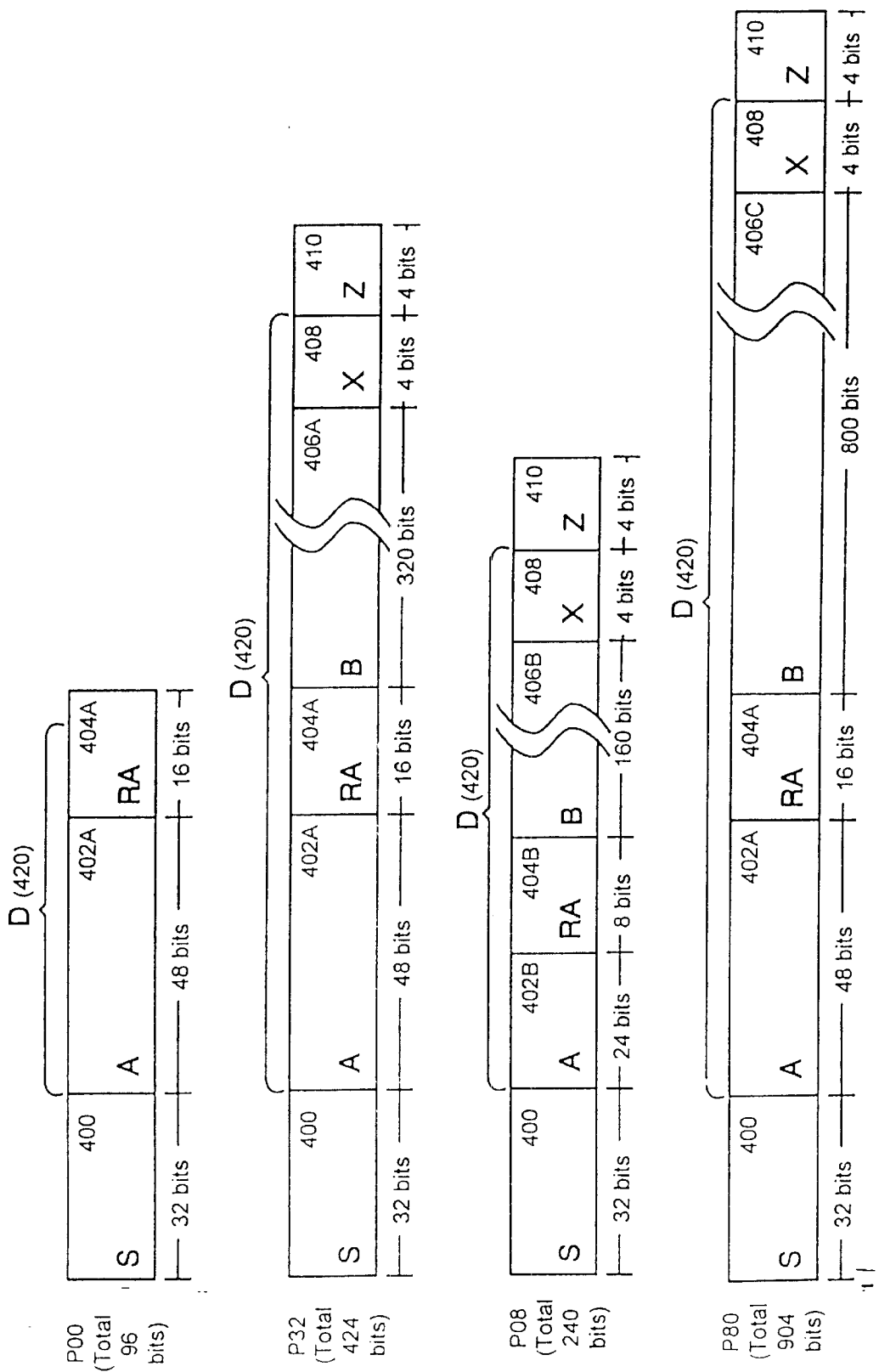
FIG. 4 shows physical packets P00, P32, P08 and P80 of the DECT radio system.
Figure 5:
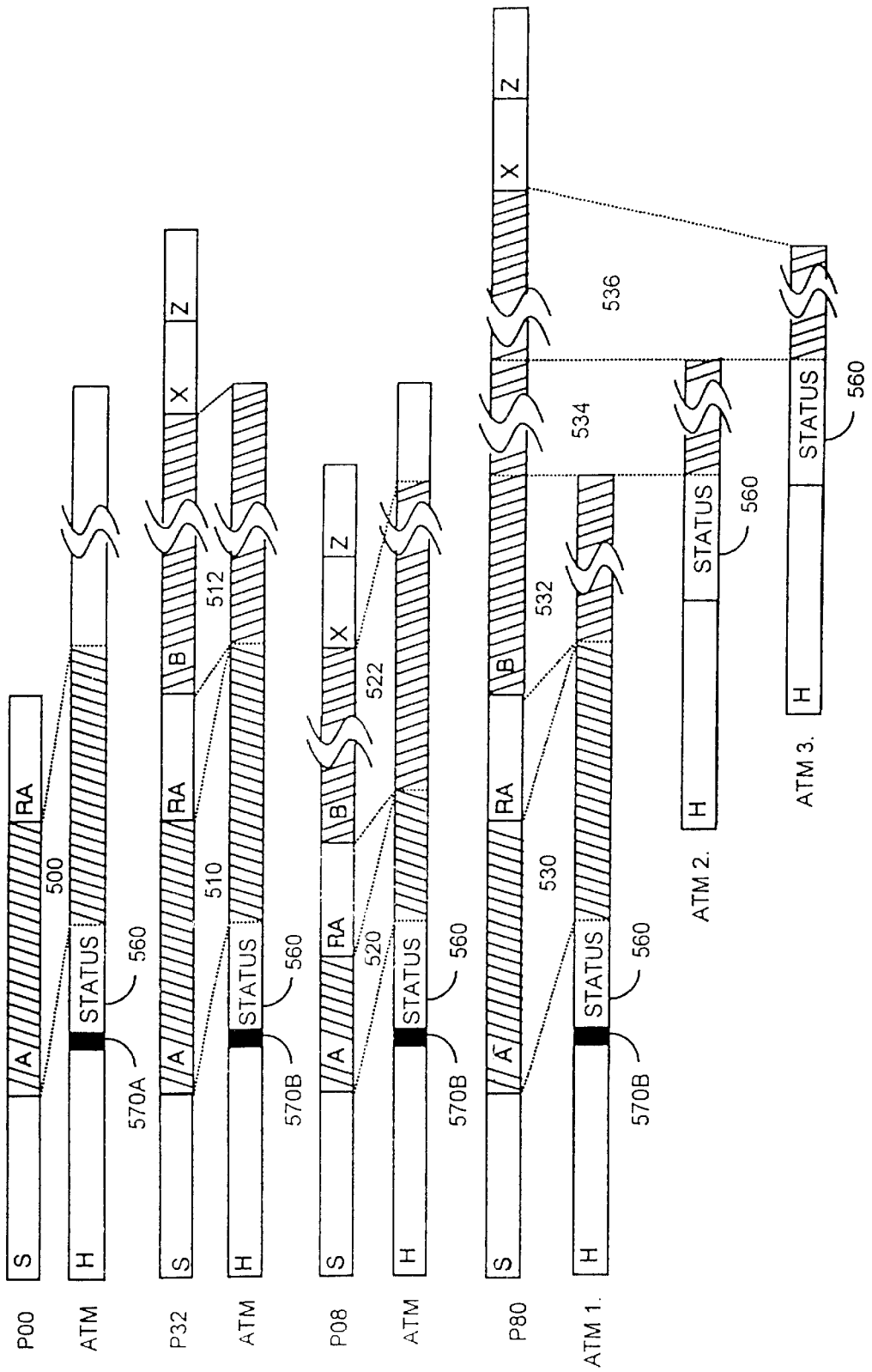
FIG. 5 shows how the physical packets P00, P32, P08 and P80 of the DECT system are inserted into an ATM cell according to the invention.

FIG. 4 illustrates physical packets of the radio interface in the DECT system, and FIG. 5 illustrates how physical packets are inserted into one or more ATM cells.

In general, the physical packet used for transmitting a time slot comprises the checksum 404A of field A and optionally also the checksum 408 of field S. According to the invention, the checksum 404A of field A and the optional checksum 408 of field B are compressed 570B into the user information 302 of the ATM cell. Most preferably, each checksum 404A, 408 is compressed into one bit in the user information 302 of the ATM cell. The physical packet used for transmitting a time slot also comprises field A 402A and possibly field B 406A. According to the invention, field A 402A and the possible field B 406A are inserted 510, 512 into the user information 302 of at least one ATM cell.

In the following, the use of the method will be described separately with reference to the different packet types (P00, P32, P08, P80).

The physical packet P00 comprises field S 400 and field D 420. Field D 420 comprises field A 402A and the checksum 404A of field A. According to the method, the checksum 404A of field A is compressed into at least one bit 570A in the user information 302 of the ATM cell, and field A is inserted 500 into the user information 302 of the ATM cell.

The physical packet P32 comprises field S 400, field D 420 and possibly field Z 410. Field D 420 comprises field A 402A, the checksum 404A of field A, field B 406A and the checksum 408 of field B. According to the method, the checksum 404A of field A and the checksum 408 of field B are compressed into at least two bits 570B in the user information 302 of the ATM cell, and field A and field B are inserted 510, 512 into the user information 302 of the ATM cell.

The physical packet P08 comprises field S 400, field D 420 and possibly field Z 410. Field D 420 comprises field A 402B, the checksum 404B of field A, field B 406B and the checksum 408 of field B. According to the method, the checksum 404B of field A and the checksum 408 of field B are compressed into at least two bits 570B in the user information 302 of the ATM cell, and field A 402B and field B 406B are inserted 520, 522 into the user information 302 of the ATM cell.

The physical packet P80 comprises field S 400, field D 420 and possibly field Z 410. Field D 420 comprises field A 402A, the checksum 404A of field A, field B 406C and the checksum 408 of field B. According to the method, the checksum 404A of field A and the checksum 408 of field B are compressed into at least two bits 570B in the user information 302 of the first ATM cell, and field A is inserted 530 into the user information 302 of the first ATM cell and field B is inserted 532, 534, 536 into the user information 302 of the first, second and third ATM cell.

In the following, the use of each field will be explained briefly.

Field S 400 (32 bits) is used for synchronizing the receiver and the packets of the radio link. Field Z (4 bits) is an optional field for detecting collision. According to the method, field Z is compressed 570B into the user information 302 of the ATM cell.

Field D 420 (length 64, 388, 196 or 868 bits depending on the type of the packet) contains data to be transmitted. Field D 420 is divided into two fields: field A 402A, 402B and field B 406A, 406B, 406C. The physical packet P00 does not include field B. Field A 402A, 402B comprises part H, part T and part RA 404A, 404B. The length of part H is 8 bits and it includes the control field of the MAC protocol layer. Part T includes signalling information. Part RA 404A, 404B includes the checksum of field A for detecting errors. Field B 406A, 406B, 406C is used for transmitting user information. Field B 406A, 406B, 406C has two different structures: a protected and unprotected form. In the unprotected form there is a checksum 408 of four bits for detecting errors at the end of part B. In the protected form there is a checksum 408 of four bits at the end of part B (as in the unprotected form).

Figure 8:
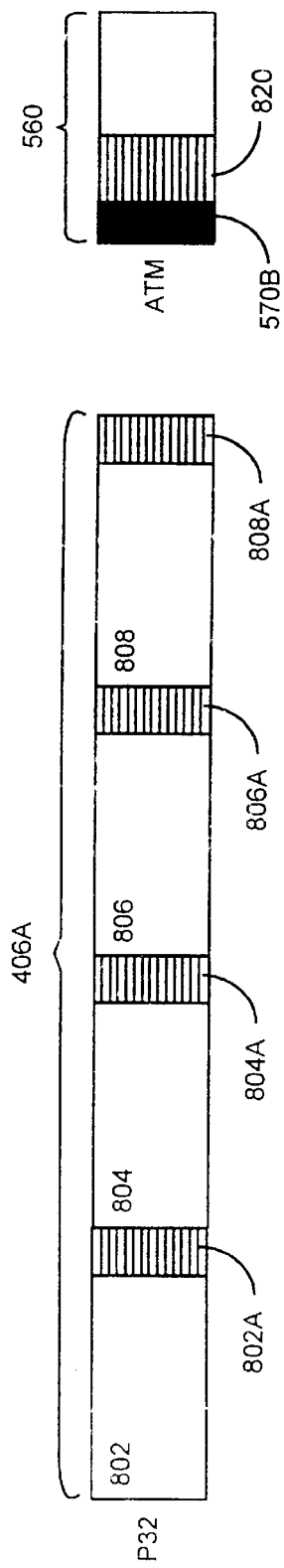
FIG. 8 shows how a possible field Z of a physical packet is inserted into an ATM cell in the DECT system according to the invention.

FIG. 8 illustrates a protected form where part B 406A is divided into blocks 802, 804, 806, 808 of 80 bits, in each of which the last 16 bits are CRC (Cyclic Redundancy Check) bits 802A, 804A, 806A, 808A. According to the method, these CRC bits are compressed 820 into the user information 302 of the ATM cell, e.g. to the status field 560 as shown in FIG. 8. FIG. 8 illustrates how this procedure is carried in the case of the physical packet P32;

packets P08 and P80 are processed similarly.

According to one preferable embodiment of the invention, the user information 302 of the ATM cell comprises a status field 560, which comprises compressed checksums 404A, 404B, 408 of field A and an optional field B as well as other information. The other information comprises CRC bits 802A, 804A, 806A, 808A in a compressed form, field Z 410 in a compressed form and status information and/or timing information related to the radio interface information and/or information related to the operation of the base station.

There is a difference in the structure of the status field 560 between an uplink and downlink transmission path.

Figure 6:
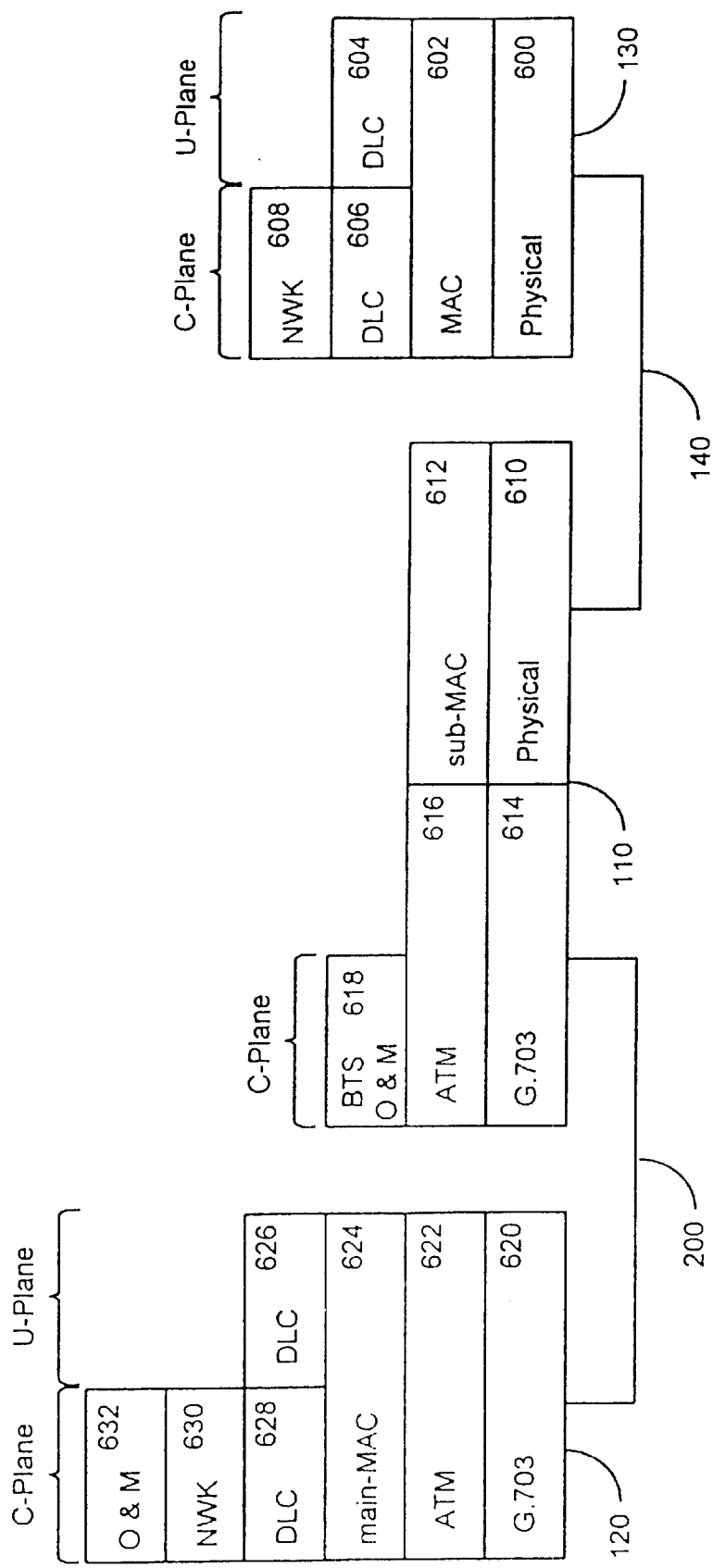
FIG. 6 shows data transmission protocols of a portable part, base station and base station controller in the DECT system according to the invention.

FIG. 6 illustrates data transmission protocols of the portable part 130, base station 110 and base station controller 120 in the DECT system according to the invention.

The data transmission protocol of the portable part 130 comprises a physical layer 600 and MAC layer 602; a DLC layer 604 on the user plane; and a DLC layer 606 and NWK layer 608 on the control plane.

In the direction to the portable part the data transmission protocol of the base station 110 comprises a physical layer 610 and sub-MAC layer 612, and in the direction to the base station controller a physical layer 614 and ATM layer 616, and an application layer 618 on the control plane.

The data transmission protocol of the base station controller 120 comprises a physical layer 620, ATM layer 622 and main-MAC layer 624; a DLC layer 626 on the user plane; and a DLC layer 628, NWK layer 630 and application layer 632 on the control plane.

Radio interface information 140 is transmitted between the portable part 130 and the base station 110. The radio interface information is transmitted between the base station 110 and the base station controller 120 e.g. as compressed into the defined structure of 2 megabytes in ATM cells 200.

The DECT protocol stack is divided into a control plane (C Plane) and user plane (U Plane) in the DLC layer. The control plane comprises an extremely reliable link mainly for control signalling within the system. The user plane comprises a link with different protection levels mainly for transmitting the user's end-to-end information (e.g. speech or data) and the user's control information.

The physical layer provides a physical transmission path for the information to be transmitted, either a TDMA carrier wave or another known way of transmitting information over the radio interface, or e.g. a cable in accordance with G.703.

The MAC layer (Medium Access Control Layer) selects physical channels on the transmission path, and then establishes and releases connections on the channels. The MAC layer also multiplexes and demultiplexes the information of the upper layers with the control information and error control information into packets with the size of a time slot.

The DLC layer (Data Link Control Layer) provides an extremely reliable data link for the NWK layer.

The NWK layer (Network Layer) is the main signalling layer of the protocol stack. Its functions are very similar to those of the third-layer protocol of the ISDN. The NWK layer is based on message exchange between peers. Basic messages support e.g. call control and mobility management.

The protocol stack includes two primary escape routes, through which producers can contact their own protocols without disturbing the functions according to the standard. The escape routes are situated on the MAC and NWK layers. The protocol stack illustrated in the figure exemplifies a way in which the application layer 632, which is in the base station controller and comprises operation and maintenance applications, is connected to the NWK layer. Messages on operation and maintenance can be transmitted to the application layer 618 of the base station, and the application layer can be contacted through the ATM layer.

The physical layer, ATM layer and part of the MAC layer illustrated in FIG. 6 correspond to the first (physical) layer of the OSI model of the ISO. The rest of the MAC layer and the DLC layer correspond to the second (data link) layer of the OSI model. The NWK layer corresponds to the third (network) layer of the OSI model. The application layer corresponds to the seventh (application) layer of the OSI model. It is clear that the application layer 632 illustrated in FIG. 6 may also include other layers of the OSI model, if operation and maintenance applications need their services. These layers are not, however, relevant to the present invention, and therefore they are not shown in detail.

In FIG. 6 the MAC layer is divided into a main-MAC layer 624 in the base station controller and a sub-MAC layer 612 in the base station. Thus part of protocol intelligence has been transferred from the base station to the base station controller. This benefits maintenance of the system and enables simplification of the system structure, as explained above. The AAL layer (ATM Adaptation Layer), belonging to the ATM layer and being responsible for the segmentation and reassembling of packets, may be preferably replaced with transmission of the status information of the status field included in the user information of the ATM cell and with processing of the status information. This simplifies the protocol processing needed.

The base station 110 and base station controller 120 comprise means 212, 222 for compressing radio interface information 140 to fit into at least one ATM cell by replacing the original error control information 404A, 404B, 408 of the radio interface information 140 with simple status information 570A, 570B. This is realised e.g. in such a manner that the base station 110 and base station controller 120 comprise means 212, 222 for compressing the radio interface information 140 to fit into at least one ATM cell by replacing the original error control information 404A, 408 of the radio interface information 140 with simple status information 570B.

Figure 7:
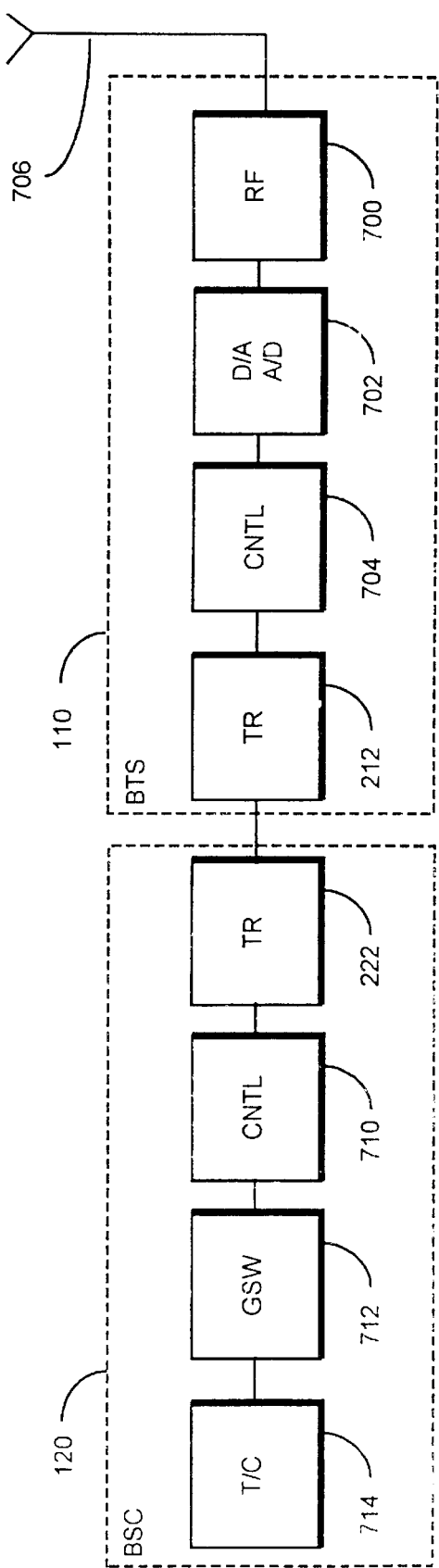
FIG. 7 shows the essential parts of the base station and base station controller implementing the method of the invention.

The base station 110 illustrated in FIG. 7 (a simplified structure) comprises an antenna 706, transceiver 700, D/A converter 702, control part 704 and means 212. The base station controller 120 comprises a transcoder 714, group switching matrix 712, control part 710 and means 222. Since the operation of the devices concerned is widely known, it will not be described in greater detail here.

In the DECT system the means 212, 222 are used for compressing the checksum 404A of field A of the physical packet P00 to be transmitted into one bit 570A in the user information 302 of the ATM cell, and for inserting 500 field A 402A into the user information 302 of the ATM cell. The means 212, 222 are also used for inserting field A 402A and the optional field B 406A into the user information 302 of the ATM cell. Furthermore, the means 212, 222 are employed for compressing CRC bits 802A, 804A, 806A, 808A into the user information of the ATM cell. The optional field Z 410 is also compressed into the user information of the ATM cell by the means 212, 222.

The simplest way of implementing the invention is to convert the steps of the method of the invention that are carried out in the means described into steps to be performed as software. In that case the software can be stored in the memory of the control unit (710 in the base station controller and 704 in the base station), and it is run in the same control unit 710, 704. In this case the software controls the operation of the means (222 in the base station controller and 212 in the base station). On the other hand, the means required by the method of the invention can be realised with general or signal processors or with discrete logic.

Although the invention has been described above by means of an example illustrated in the accompanying drawings, it will be obvious that the invention is not limited to it, but may be modified in several ways within the inventive concept disclosed in the appended claims. It will be obvious that e.g. the means may be arranged otherwise, changes may be made to the protocol stack or the information may be compressed differently. Such modifications do not, however, deviate from the basic idea of the invention.

What is claimed is:

1. A method of transmitting radio interface information over a bidirectional data link between a base station and a base station controller, the radio interface information comprising signalling information, user information and error control information, the method comprising:

inserting the signalling information and the user information into ATM cells, and compressing the radio interface information to fit into at least one ATM cell by replacing the error control information with simple status information.

2. The method as claimed in claim 1, wherein the ATM cell comprises identification data and user information, and the error control information is a checksum of a physical packet used for transmitting radio interface information, and the checksum is compressed into the user information of the ATM cell.

3. The method as claimed in claim 1, wherein the ATM cell comprises identification data and user information, and when the method is used in the DECT system, a physical packet used for transmitting the radio interface information comprises as the error control information a checksum of field A and optionally a checksum of field B, and the checksum of field A and the optional checksum of field B are compressed into the user information of the ATM cell.

4. The method as claimed in claim 3, wherein the physical packet also comprises field B, the protected form of which comprises at least one block which comprises CRC bits, and the CRC bits are compressed into the user information of the ATM cell.

5. The method as claimed in claim 3, wherein the physical packet also comprises field Z, and the field Z is compressed into the user information of the ATM cell.

6. The method as claimed in claim 3, wherein each checksum is compressed into at least one bit in the user information of the ATM cell.

7. The method as claimed in claim 1, wherein the ATM cell comprises identification data and user information, and when the method is used in the DECT system, a physical packet used for transmitting the radio interface information comprises field A and optionally field B, and the field A and the optional field B are inserted (510, 512) into the user information (302) of at least one ATM cell.

8. The method as claimed in claim 3, wherein the user information of the ATM cell comprises a status field, which comprises the compressed checksum of field A, and the compressed checksum of the optional field B.

9. The method as claimed in claim 8, wherein the status field further comprises compressed CRC bits.

10. The method as claimed in claim 8, wherein the status field further comprises a compressed field Z.

11. The method as claimed in claim 8, wherein the status field further comprises at least one of the following: status information related to the radio interface information, and timing information related to the radio interface information.

12. The method as claimed in claim 1, wherein when the method is used in the DECT system the data transmission protocol of a portable part comprises a physical layer and MAC layer, a DLC layer on a user plane, and a DLC layer and NWK layer on a control plane;

the data transmission protocol of the base station comprises a physical layer and sub-MAC layer in the direction to the portable part, and a physical layer and ATM layer, and an application layer on the control plane in the direction to the base station controller, and the data transmission protocol of the base station controller comprises a physical layer, ATM layer and main-MAC layer, a DLC layer on the user plane, and a DLC layer, NWK layer and application layer on the control plane.

13. A system for transmitting radio interface information over a bidirectional data link between a base station and a base station controller, the radio interface information comprising signalling information, user information and error control information, and the signalling information and the user information being inserted into ATM cells, and the base station and the base station controller comprise means for compressing the radio interface information to fit into at least one ATM cell by replacing the error control information with simple status information.

14. The system as claimed in claim 13, wherein the ATM cell comprises identification data and user information, and the error control information is a checksum of a physical packet used for transmitting radio interface information, and the means for compressing compresses the checksum into the user information of the ATM cell.

15. The system as claimed in claim 13, wherein the ATM cell comprises identification data and user information, and in the DECT system a physical packet used for transmitting the radio interface information comprises a checksum of field A and optionally a checksum of field B, and the means for compressing compresses the checksum of field A and the optional checksum of field B into the user information of the ATM cell.

16. The system as claimed in claim 13 wherein the ATM cell comprises identification data and user information, and in the DECT system a physical packet used for transmitting radio interface information also comprises field B, the protected form of which comprises at least one block, which comprises CRC bits, and the means for compressing compresses the CRC bits into the user information of the ATM cell.

17. The system as claimed in claim 13, wherein the ATM cell comprises identification data and user information, and in the DECT system a physical packet used for transmitting the radio interface information also comprises field Z, and the means for compressing compresses the field Z into the user information of the ATM cell.

18. The system as claimed in claim 13, wherein the ATM cell comprises identification data and user information, and in the DECT system a physical packet used for transmitting the radio interface information comprises field A and optionally field B, and the base station and base station controller comprise means for inserting the field A and the optional field B into the user information of the ATM cell.

* * * * *